United States Patent [19]

Braeger

[11] Patent Number: 4,765,031

[45] Date of Patent: * Aug. 23, 1988

[54] METHOD FOR SEVERING THE HEADS FROM FISH

[75] Inventor: Horst Braeger, Lübeck, Fed. Rep. of Germany

[73] Assignee: Nordischer Maschinenbau Rud. Baader GmbH+Co KG, Lübeck, Fed. Rep. of Germany

[*] Notice: The portion of the term of this patent subsequent to Jan. 23, 2002 has been disclaimed.

[21] Appl. No.: 446,599

[22] Filed: Dec. 3, 1982

[51] Int. Cl.⁴ .............................................. A22C 25/14
[52] U.S. Cl. ............................................ 17/52; 17/63
[58] Field of Search .......................... 17/60, 63, 59, 52

[56] References Cited

U.S. PATENT DOCUMENTS 3,123,853  3/1964  Radloff et al. ......................... 17/63

FOREIGN PATENT DOCUMENTS 1292819  4/1969  Fed. Rep. of Germany .......... 17/63
2554598  6/1976  Fed. Rep. of Germany .......... 17/63
1385381  2/1975  United Kingdom ..................... 17/63

Primary Examiner—Willie G. Abercrombie
Attorney, Agent, or Firm—Edward F. Levy

[57] ABSTRACT

A method for severing the heads from fish makes a better yield of fish flesh supplied for human consumption possible. In this method the supracleithra forming the connection between the head skeleton and the shoulder girdle arcs are split off after the gill cavity has been opened ventrally by cutting through the isthmus and finally the head is pulled from the rump in a position where it is jack-knifed towards the nape of the neck.

3 Claims, 1 Drawing Sheet

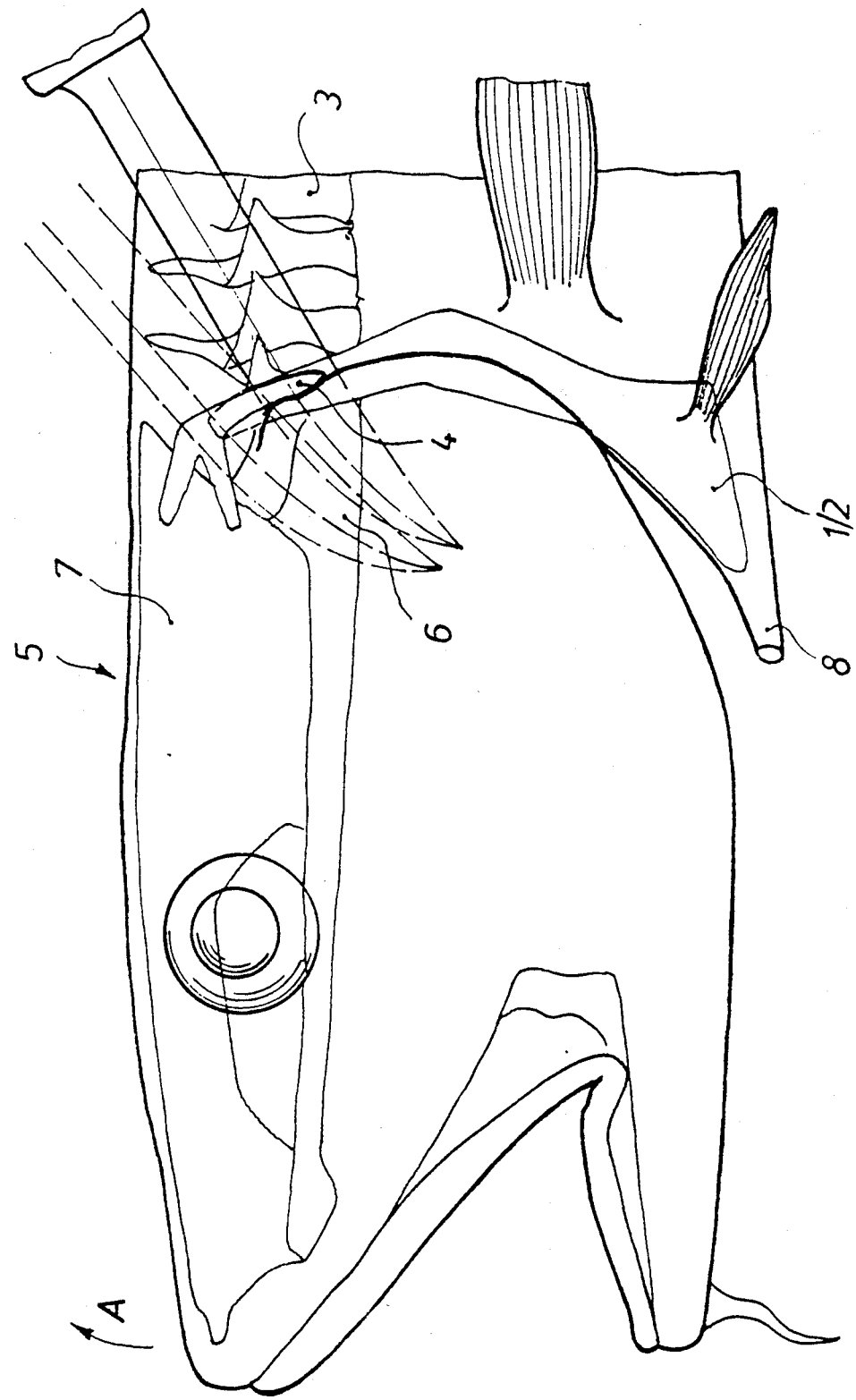

METHOD FOR SEVERING THE HEADS FROM FISH

BACKGROUND OF THE INVENTION

1. Field of the Invention

The invention concerns a method for severing the heads from fish with their gill cavity opened by a ventral throat cut.

2. Description of Prior Art

The beheading of fish normally occurs (see e.g. DE-PS No. 11 77 783) by a cutting penetration of the total cross-section of the fish in the region of or near the gill cavity. In order to achieve as high a yield of valuable fillet flesh as possible a device comprising two circular knives arranged at an obtuse angle to each other is preferably used, which knives penetrate the fish essentially symmetrically to its plane of symmetry.

A further known method of beheading (see e.g. DE-PS No. 15 79 416) resides in using a circular knife which is led with its cutting plane perpendicular to the plane of symmetry of the fish and cuts from the front part (Os frontale) of the cranium to the Os occipitale, the Isthmus having been severed by a throat cut. In this so-called round cut the shoulder girdle remains on the rump of the fish and can be removed before the filleting in a separate working step.

These beheading methods are not satisfactory, however, with respect to the yield of fish flesh which can be used for human consumption since it is not possible to gain the muscle flesh lying on the cranium on both sides of the web like OS occipitale superius.

Consequently it has been tried to separate the head by tearing it off after the isthmus has been separated (see NO-B 140 576). In this process the head is bent dorsally with respect to the rump and removed from the latter in this position. The result of this method is not satisfactory either since the mentioned fish pieces cannot be removed with certainty together with the muscle flesh of the fillets. The reason for this is that the shoulder girdle remaining on the fish rump is connected to the head skeleton with sinews and cords whose bases are stronger than the muscle flesh depending on the consistency of the latter. Furthermore the torn surface is disadvantageous for optical and bacteriological reasons.

3. Object of the Invention

It is therefore an essential object of the invention to propose a method for severing the heads of fish avoiding the above-mentioned deficiencies.

SUMMARY OF THE INVENTION

This object is solved according to the invention by a method in which the supracleithra lying on both shoulder girdle arcs are split off near an imaginary horizontal plane running through the spinal column, whereupon the connection of the vertebral column with the head skeleton is disjointed by bending the head back towards the nape of the neck in a jack-knife manner and head and rump are pulled apart in this jack-knifed position.

The advantages of this method lie especially in that by pre-severing the cords which hinder the pulling off of the head a reliable loosening of the mentioned flesh parts by leaving the same on the muscle flesh of the fillets is made possible and therefore a more certain yield profit is achieved. Beyond that the application of the method according to the invention can make certain that no free bones or parts of bones which could, e.g. hinder a following - known - filleting process are left on the rump of the fish. This has the further advantage that the expensive quality control and possible corrections in this area can be saved.

The drawing shows a side view of the head part of a fish.

This fish head presents the left part of a pair of shoulder girdle arcs 1, 2 lying on both sides of an - imaginary - symmetrical plane of the fish and of the vertebral column 3. One supracleithrum of a pair of supracleithra 4 lie on these shoulder girdle arcs in their upper region, and they are connected therewith by non-shown bands or sinews and form the upper connection of the shoulder girdle arcs, which are often also termed collar bones, to the head skeleton, the upper part of which is essentially formed by the cranium 7 (neurocranium).

In the rearward part of the lower jaw area, which has not been designated in detail, there is the isthmus 8, which connects the lower part of the shoulder girdle arcs with the lower jaw.

As has been shown in the drawing the gill cavity of the fish lying in the area of the shoulder girdle arcs has already been opened by severing the isthmus 8. The process according to the invention is carried out by severing along the outside of the shoulder girdle arcs 1, 2 and below the supracleithra 4, which may be done by means of a knife 6 which is shown in two different working positions. By such action the ends connecting these bones are severed and thus the supracleithra 4 are split off. When this has been completed the head is bent in a backward direction as indicated by arrow A, e.g. by engaging the mouth of the fish, and thus the connection between the vertebral column 3 and the head skeleton 5 is disjointed. In the dislocated resp. angled off position head and rump are pulled apart by exerting tension on either of these.

What is claimed is:

1. A method for severing the heads from fish with their gill cavity opened from the belly side by a throat cut, wherein firstly the superacleithra lying on the upper portions of both shoulder girdle arcs located at opposite sides of the plane of symmetry of the fish are split off to disconnect the shoulder girdle arcs from the head skeleton of the fish, whereupon the connection of the vertebral column with the head skeleton is disjointed be bending the head back towards the nape of the neck in a jack-knife manner and in this jack-knifed position the head and rump are pulled apart.

2. A method for severing the heads from fish with their gill cavity opened from the belly side by a throat cut, comprising the steps of:
   splitting off both supracleithra from their connected shoulder girdle arcs by severing along the outer side of each shoulder girdle arc through its area of connection with the respective supracleithrum, thereby disconnecting the shoulder girdle arcs from the head skeleton of the fish,
   thereafter disjointing the connection of the vertebral column with the head skeleton by bending the head back towards the nape of the neck in a jack-knife manner, and
   pulling apart the head and rump in the jack-knifed position of the head.

3. A method according to claim 2 in which the splitting off of the supracleithra is accomplished by the insertion of a knife through the top side of the fish and moving said knife along the outer surface of each shoulder girdle arc through its area of connection with the respective supracleithrum.

* * * * *